United States Patent
Murashima

(10) Patent No.: US 7,164,485 B2
(45) Date of Patent: Jan. 16, 2007

(54) IMAGE FORMING APPARATUS

(75) Inventor: Hironaga Murashima, Numazu (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 891 days.

(21) Appl. No.: 10/254,783

(22) Filed: Sep. 26, 2002

(65) Prior Publication Data
US 2004/0061887 A1 Apr. 1, 2004

(51) Int. Cl.
G06K 1/00 (2006.01)
G06F 15/00 (2006.01)

(52) U.S. Cl. .................. 358/1.14; 358/1.1; 358/1.7

(58) Field of Classification Search ......... 358/3.22, 358/1.14, 1.1, 1.7
See application file for complete search history.

(56) References Cited

U.S. PATENT DOCUMENTS 5,351,313 A * 9/1994 Bessho et al. ............. 382/172
5,699,172 A * 12/1997 Hattori et al. ............. 358/3.27
5,751,434 A * 5/1998 Narendranath et al. ...... 358/1.9
2001/0013939 A1 * 8/2001 Weaver et al. ............. 358/1.9
2003/0123907 A1 * 7/2003 Nonaka et al. ............. 399/257
2003/0164977 A1 * 9/2003 Aagesen ................... 358/1.15

FOREIGN PATENT DOCUMENTS

JP 8-123257 5/1996
JP 9-39298 2/1997

* cited by examiner

Primary Examiner—Kimberly Williams
Assistant Examiner—Charlotte M. Baker
(74) Attorney, Agent, or Firm—Foley & Lardner LLP

(57) ABSTRACT

When image data from an external device is image data for proof printing, the number of pages of image data is calculated. Further, the percentage of a character image region and the percentage of a photographic image region in all the image data are determined. A reduction in toner consumption is determined according to the number of pages, the percentage of the character image region and the percentage of the photographic image region, and a document is then printed.

10 Claims, 5 Drawing Sheets

IMAGE FORMING APPARATUS

BACKGROUND OF THE INVENTION

The present invention relates to an image forming apparatus such as a printer and a digital copying machine.

Image forming apparatuses, such as digital copying machines, generally have a printer function, whereby documents created by external equipment, such as a personal computer, can be printed, and a copier function, whereby original documents can be copied. Some image forming apparatuses have a toner saving mode in which, to save toner, printing is carried out with the amount of toner used controlled more than usual.

Where there is a need to print a document in great numbers, the document may be proof printed in order to confirm the arrangement of printed document images. If the arrangement of a page image of the document proof printed by the image forming apparatus is correct, the user prints the required number of copies of the document. The main object of proof printing is to confirm the arrangement of printed document images. Thus, the toner consumption can be reduced by choosing the toner saving mode at the time of proof printing by way of example.

Conventionally, methods of printing with toner consumption reduced in an image forming apparatus include methods disclosed in Jpn. Pat. Appln. KOKAI Publication No. 9-39298 (image recording apparatus and image recording method) and in Jpn. Pat. Appln. Publication No. 8-123257 (electrophotographic apparatus).

In Jpn. Pat. Appln. Publication No. 9-39298, if, when the recording material saving record mode is on, pixels are decided to be included in an area where toner is to be heavily coated, image information for these pixels is changed to low-density recording information and then low-density recording is made on the basis of the changed image information.

In Jpn. Pat. Appln. Publication No. 8-123257, in the toner saving mode the data width per dot is reduced through control of the controller, thereby reducing the toner consumption. In this publication as well, only when the user specifies the toner saving mode, the toner consumption is reduced through control of the controller.

Thus, with the conventional image forming apparatus having the toner saving mode in which printing is made with toner consumption controlled, the toner consumption will not be reduced unless the said mode is turned on. That is, the user is required to consider what purpose document images to be printed are used for and then turn the toner saving mode on or off for each document. Such operation is troublesome.

SUMMARY OF THE INVENTION

It is an object of the present invention to provide an image forming apparatus which, at the time of proof printing or printing of images retained in a storage device such as a hard disk, permits the consumption of toner to be adjusted according to the number of pages to be printed or the types of images and printing to be made with the toner consumption reduced without being accompanied by considerable degradation in image quality.

In the case of documents, such as character images, which have no half-tone images, even if they are printed with the amount of toner used reduced more than usual, no considerable degradation in image quality will occur. When the number of pages to be printed is large, the toner saving effect is great even if the reduction of toner per page is small.

Thus, an image forming apparatus according to an embodiment of the present invention, upon receipt of image data for which proof printing is specified, examines the contents of the image data to be proof printed, determines the toner saving intensity (reduction) on the basis of preset conditions, and prints the document with toner saved automatically.

According to another embodiment of the present invention, a toner saving print mode is set up in which printing is done with the toner saving intensity determined according to the number of pages of received image data, the number of print copies, and the types of images such as character, photograph, etc. By printing a document in this way, the consumption of toner can be reduced significantly without being accompanied by considerable degradation of image quality.

BRIEF DESCRIPTION OF THE OF DRAWINGS

DETAILED DESCRIPTION OF THE PREFERRED EMBODIMENTS

Figure 1:
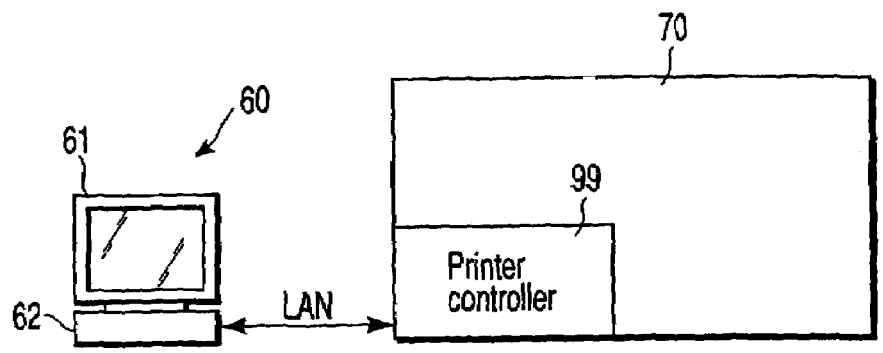
FIG. 1 is a schematic illustration of a printing system of an image forming apparatus to which the present invention is applied.

FIG. 1 is a schematic illustration of a printing system of an image forming apparatus to which the present invention is applied.

A PC 60 includes a PC body 62 and a monitor 61 as a display unit. The PC body 62 includes a CPU, an HDD, a RAM, a network interface, a mouse, a keyboard, an operation system, application software which allows document creation, etc., and a printer driver which converts a document created by that application to document data suitable for a printer in use. The PC 60 can transmit the created document to a printer controller 99 in an image forming apparatus 70 over a LAN through the use of the printer driver. In addition, by means of the printer driver the PC 60 can transmit to the printer controller 99 image information created by a document creation or similar application for which proof printing has been specificatied.

The printer controller 99 in the image forming apparatus 70 can receive and store image data to be printed transmitted from the PC 60 and provides stored image data to the printer unit of the image forming apparatus 70.

Figure 2:
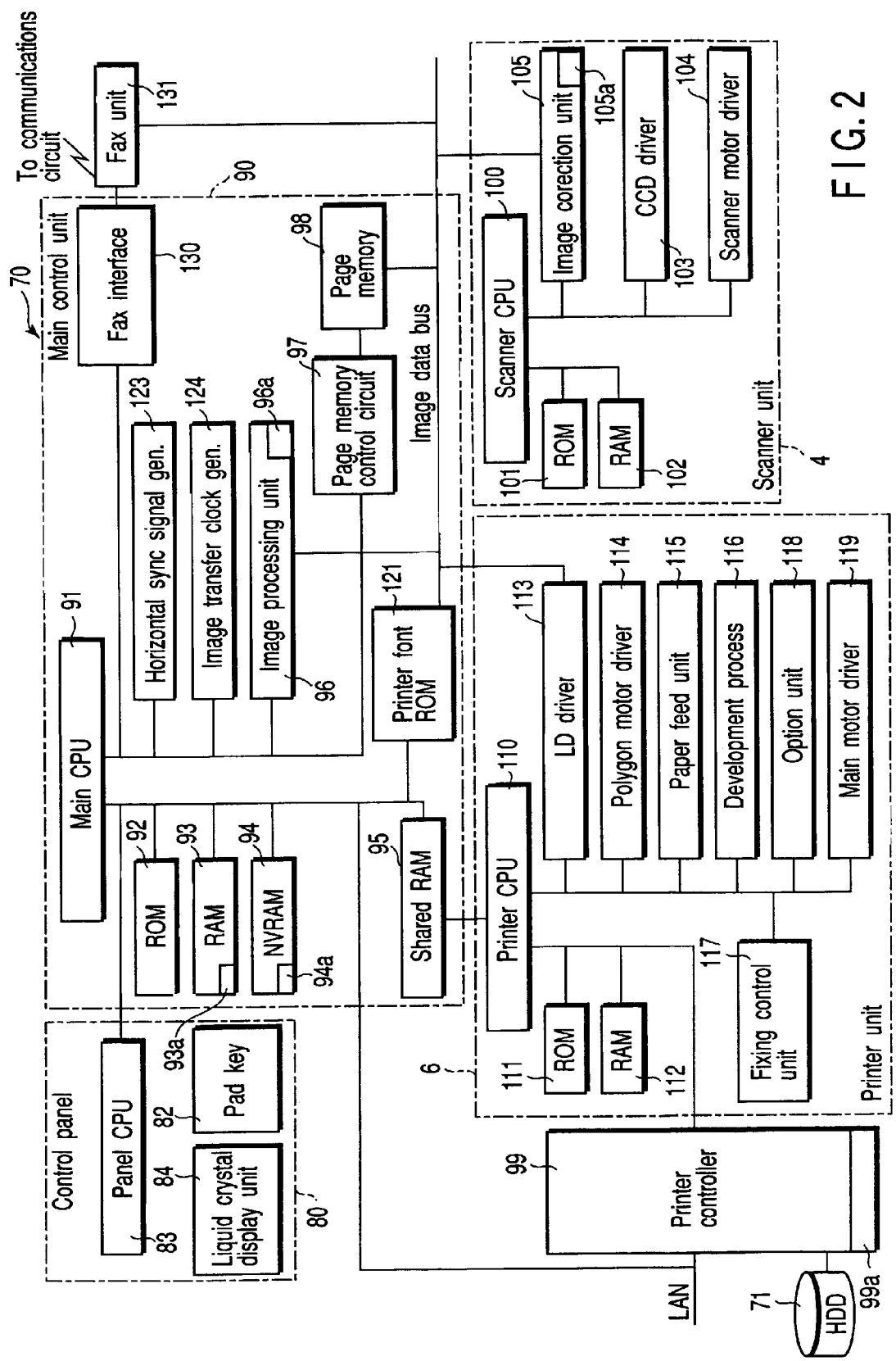
FIG. 2 is a block diagram of the image forming apparatus 70.

FIG. 2 is a block diagram of the image forming apparatus 70. The image forming apparatus 70 includes a scanner unit 4 that reads the image of an original and provides image data corresponding to the read original image, the printer controller 99, a printer unit 6 that forms an image on paper on the basis of image data from the scanner unit 4 or the printer controller 99, a control panel 80 that provides a user interface, and a main control unit 90 that controls each component of the image forming apparatus 70 on the basis of the user's commands entered through the control panel 80.

The details of each block shown in FIG. 2 are described in U.S. patent application Ser. No. 09/649,009. Therefore, only blocks particularly related to the present invention will be described hereinafter. U.S. patent application Ser. No. 09/649,009 is incorporated herein by reference.

The printer controller 99 receives image data (print data) from external equipment, such as the PC 60, over the LAN and temporarily stores that image data in an HDD 71. The image data includes data representing character codes, character size, and resolution, etc., and data representing the density of each pixel in a photographic image or the like. The printer controller 99 provides the image data stored in the HDD 71 to the main control unit 90 as instructed by a main CPU 91. The CPU 91 writes the image data provided from the printer controller into a page memory 98. At this point, the CPU 91 converts the character codes into character images using font data stored in a printer font ROM 121 and then stores them in the page memory 98.

Hereinafter, an embodiment of the present invention to reduce toner consumption will be described.

In printing a document created by the PC 60 in great numbers, say, in one hundred copies, the user is generally allowed to determine, on the monitor 61, whether or not the created document will be printed in a desired arrangement through the use of the print preview facility of the document creating application installed on the PC 60. Depending on the printer (or image forming apparatus) connected to the PC 60, however, there may exist some difference in arrangement between the document image displayed on the monitor 61 and the document image actually printed by the printer.

Proof printing, which is a function used in such a case, can be specified by the printer driver installed on the PC 60. Upon receiving from the PC 60 image data for which proof printing has been specified, the image forming apparatus 70 prints that document using the printer unit 6 and retains the document data. When the printed document images are arranged as desired, the user inputs the number of copies through the use of the control panel 80 of the image forming apparatus 70 and then presses the start button (not shown), whereby the number of copies of the document input to the printer 6 are printed using the document data retained in the HDD 71.

Since the proof printing is printing for determining whether or not document images are printed in a desired arrangement, no problem will arise even if there is some reduction in the density of the printed images. By printing with the image density set lower than the actual values of image data, the toner consumption can be controlled. However, when the number of pages of a document to be proof printed is small, the toner consumption is little reduced even if printing is done with the density lowered (with toner saved). Printing images having gradations, such as pictorial and photographic images, with low density will result in considerable reduction in image quality; thus, this is not desirable. Therefore, the image forming apparatus 70 of the present invention does proof printing by changing the toner saving intensity according to the number of pages of document data and the types of images which are to be proof printed.

Figure 3:
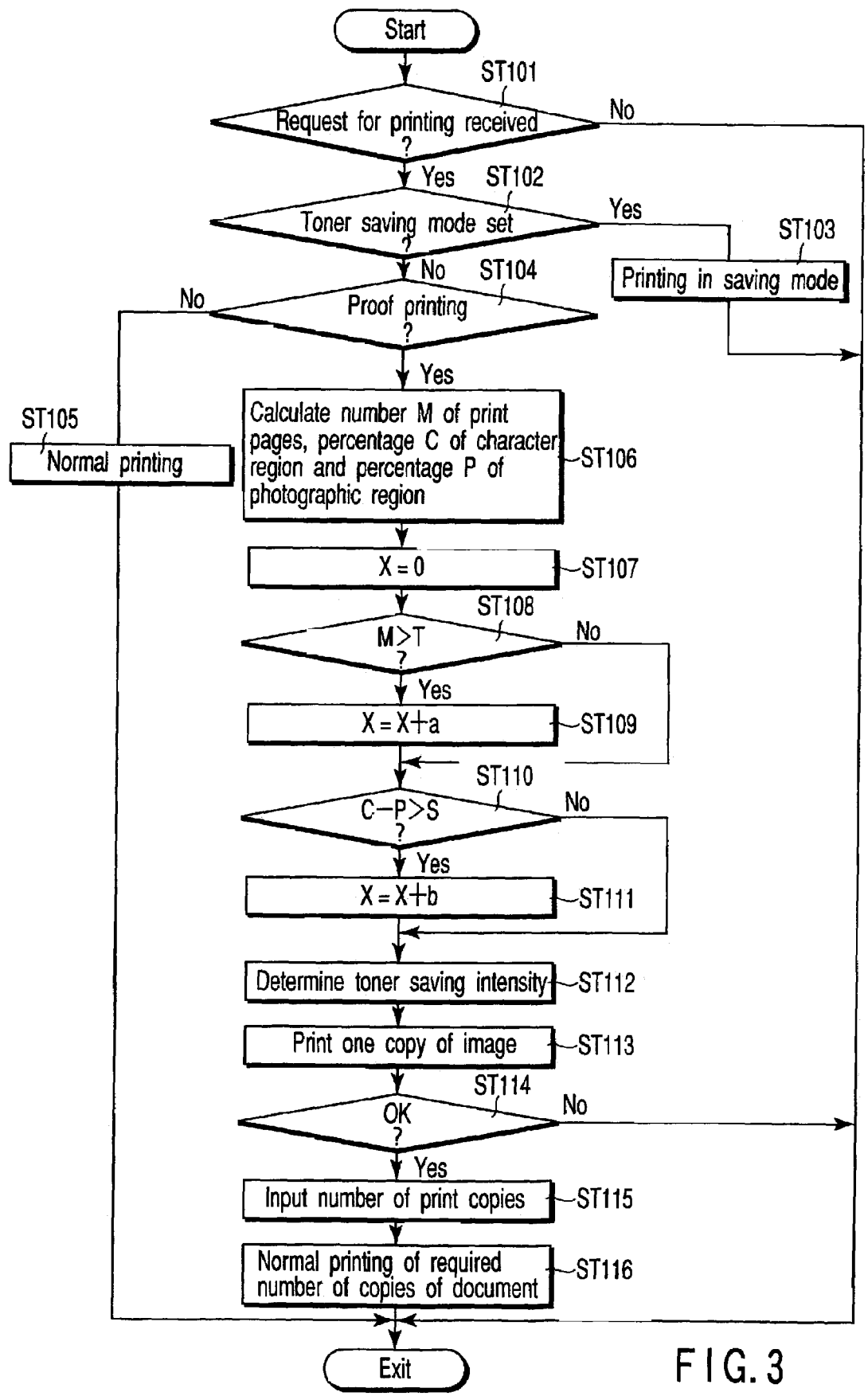
FIG. 3 is a flowchart illustrating the main flow of toner saving intensity determination processing according to an embodiment of the present invention.

FIG. 3 is a flowchart illustrating the main flow of toner saving intensity determination processing according to an embodiment of the present invention.

In the toner saving intensity determination processing, upon receipt of image information for which proof printing has been specified from the PC 60 at the printer controller 99, the image forming apparatus 70 determines the intensity at which toner is to be saved (reduction). In this flowchart, let the number of pages to be printed be M, the threshold for M be T, the percentage of character or line drawing regions (hereinafter referred to simply as character regions) in all image data be C, the percentage of regions, such as pictures or photographs, which have gradations (hereinafter referred to simply as the photographic regions) be P, a threshold for C–P be S, the toner intensity be X, and arbitrary natural numbers that are different from each other be a and b.

First, upon receipt of a request for printing from the printer controller 99 (step 101), the CPU 91 makes a decision of whether the print mode has been set to the toner saving mode (step 102). This toner saving mode, set by the user through the use of the PC 60, is information that is stored in the HDD 71 connected to the controller 99. By default, the toner saving mode is normally set off (toner is not saved).

Where the print mode has been set to the toner saving mode, the CPU 91 controls the printer controller 99 to transfer image data stored in the HDD 71 to the page memory 98. Further, the CPU 91 causes, for example, the image processing unit 96 to perform image processing corresponding to the toner saving mode and the printer unit 6 to print (step 103).

When the print mode is not set to the toner saving mode (No in step 102), the CPU 91 refers to a flag in a table 99a of the printer controller 99 to make a decision of whether or not printing of image data stored in the HDD 71 has been set to proof printing (step 104). This flag, which indicates proof printing, is set in response to control data transferred together with image data from the PC 60 to the printer controller 99.

When proof printing is not set (No in step 104), the CPU 91 transfers image data stored in the HDD 71 to the page memory 98, then causes the image processing unit 96 to perform normal image processing and the printer unit 6 to do normal printing (step 105).

When proof printing has been set (Yes in ST104), the CPU 91 transfers image data stored in the HDD 71 to the page memory 98 and stores the number M of pages to be printed in the table 99a of the printer controller 99 as in step 99a. Here, an image region identification section 96a of the image processing unit 96 identifies a character region and a photographic region in image information stored in the page memory 98. The CPU 91 calculates the area Ac of the character region, the area Ap of the photographic region, the percentage C of the character region area Ac in all image data, and the percentage P of the photographic region area Ap in all image data and stores them in the table 99a. In subsequent step 107, a variable X used to determine the toner saving intensity is initialized to "0".

If, in proof printing as well, there is a need to print with normal density, the toner saving mode in proof printing may be set on or off. Such setting is performed by the user through the use of the PC 60 and the setting information is stored in the HDD 71.

In step 108, a decision is made as to whether the number M of pages to be printed which has been stored in the printer controller 99 in step 106 is greater than the threshold T (an arbitrary natural number). If the number M of pages to be printed is greater than the threshold T, the CPU 91 stores the sum of the variable X representing the toner saving intensity and an arbitrary natural number a in the table 99a of the printer controller 99 as the toner saving intensity X in step 109. When M is smaller than T (No in step 108), the toner saving intensity X remains as it is. At this point, no matter what value the toner saving intensity X takes, the CPU 91 stores it in the table 99a of the printer controller 99.

Next, the CPU 91 calculates the difference between the character percentage C and the photograph percentage P obtained in step 106. The CPU 91 then decides whether the difference between the character percentage C and the photograph percentage P is greater than the threshold S (an arbitrary percentage (step 110). If the difference between the character percentage C and the photograph percentage P is greater than the threshold S, the sum of the variable X representing the toner saving intensity and an arbitrary natural number b is stored in the table 99a as the toner saving intensity X as in step 111. If the difference between the character percentage C and the photograph percentage P is greater than the threshold S (No in step 110), the toner intensity variable X remains as it is. At this point, no matter what value the toner saving intensity X takes, the CPU 91 stores it in the table 99a.

Figure 4:
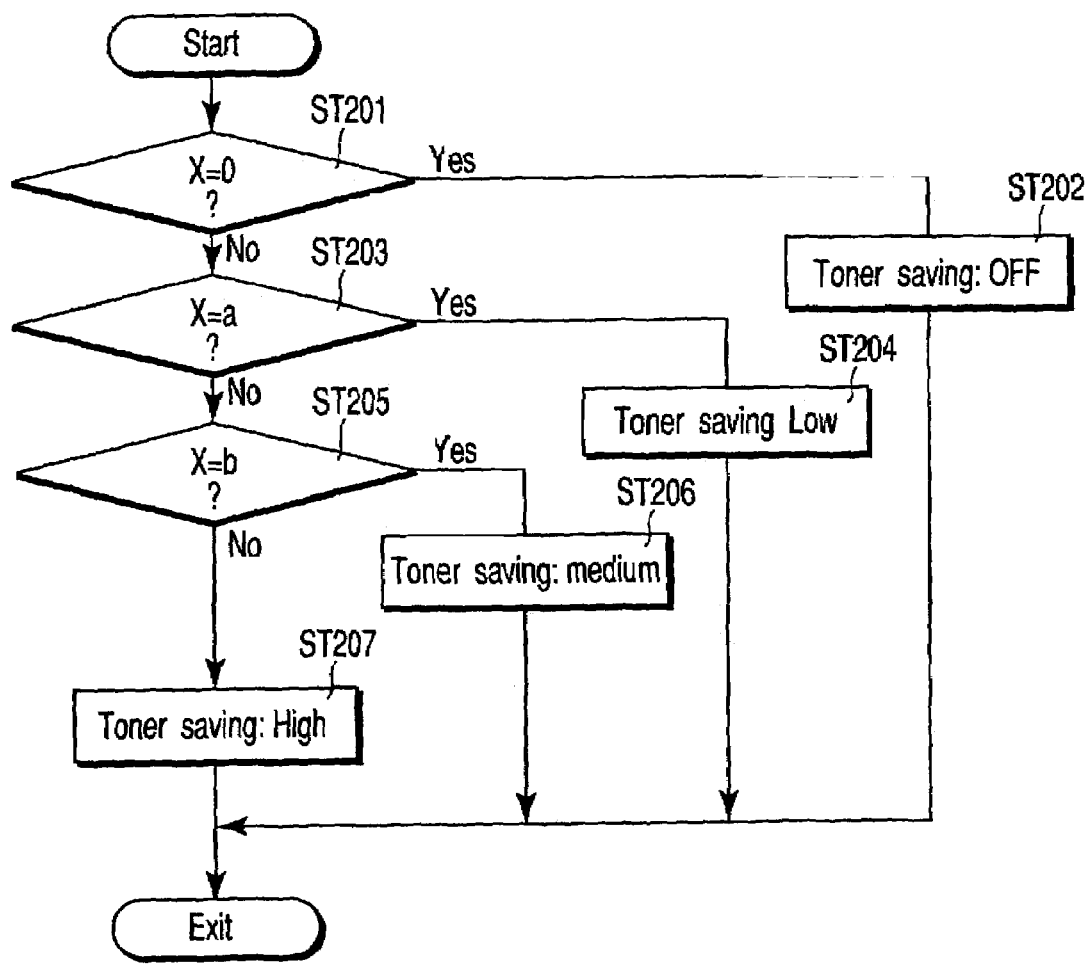
FIG. 4 is a flowchart illustrating the details of the toner saving intensity determination process (ST112) in FIG. 3.

Step 112 is a process of determining the substantial intensity of the toner saving intensity X obtained by the processing so far. FIG. 4 is a flowchart illustrating the detail of the toner saving intensity determination process in step 112.

The CPU 91 reads the toner saving intensity X from the table 99a and then makes a decision of whether the intensity X is "0" as in step 201. That the toner saving intensity X is "0" indicates that the number of pages of image data for proof printing is small and the photographic region is relatively large. If, when the number of pages is small, printing is made with toner saved, the toner saving effect is small. If a photographic region image is printed with toner saved, there will be a significant reduction in image quality. When the intensity X is "0", therefore, the toner saving is not set at all and the CPU 91 stores "00" into a table 93a of a RAM 93. If the toner saving intensity X is not 0 (No in step 201), the flow goes to step 203.

In step 203, the CPU 91 makes a decision of whether the toner saving intensity X is "a". That the toner saving intensity X is "a" indicates that the number of pages of image data for proof printing is large and the photographic region is relatively large. If a photographic region image is printed with toner saved, there will be a significant reduction in image quality. When the number of pages is large, printing with toner saved will increase the toner saving effect.

When the intensity X is "a", therefore, the CPU 91 sets the toner saving intensity as "LOW" and stores "01" into the table 93a of the RAM 93. If the toner saving intensity X is not a (No in step 203), the flow goes to step 205.

In step 205, the CPU 91 makes a decision of whether the toner saving intensity X is "b". That the toner saving intensity X is "b" indicates that the number of pages for image data for proof printing is small and the character region is relatively large. If, when the number of pages is small, printing is made with toner saved, the toner saving effect is small.

Even if a character region image is printed with toner saved, there will be little reduction in image quality. When the intensity X is "b", therefore, the CPU 91 sets the toner saving intensity as "MEDIUM" and stores "10" into the table 93a of the RAM 93. If the toner saving intensity X is not b (No in step 205), the flow goes to step 207.

If No in step 205, the toner saving intensity X is "a+b". That the toner saving intensity X is "a+b" indicates that the number of pages of image data for proof printing is large and the character region is relatively large. If, when the number of pages is large, printing is made with toner saved, the toner saving effect will be great. Even if a character region image is printed with toner saved, there will be little reduction in image quality. When the intensity X is "a+b", therefore, in step 207 the CPU 91 sets the toner saving intensity as "HIGH" and stores "11" into the table 93a of the RAM 93.

Here, the toner saving intensity set in steps 202, 204, 206 and 207 will be defined.

With the toner saving setting of OFF in step 202, printing is made with exactly the same amount of toner as normal printing and the saving of toner is not performed at all.

With the toner saving setting of LOW in step 204, toner is saved by such a small amount that the person who instructed proof printing, when seeing the printed image, can hardly recognize the saving of toner. A reduction of toner consumption by this setting is set to about ten percent of the toner consumption in normal printing.

With the toner saving setting of MEDIUM in step 206, toner is saved to such an extent that the person who instructed proof printing, when seeing the printed image, can recognize the saving of toner. A reduction of toner consumption by this setting is set to about twenty percent of the toner consumption in normal printing.

With the toner saving setting of STRONG in step 207, toner is saved to such an extent that the person who instructed proof printing, when seeing the printed image, can clearly recognize the saving of toner. A reduction of toner consumption by this setting is set to about forty percent of the toner consumption in normal printing.

Returning to FIG. 3, in step 113 the CPU 91 prints an image for proof printing stored in the page memory 98 in one copy on the basis of toner saving intensity stored in the table 93a. When toner saving is carried out on the basis of image processing by the image processing unit 96 as described above, the image density of an image for proof printing is converted to a low value and/or the line width of characters and line drawings is reduced. The toner saving may be achieved by controlling a development processing unit 116 to thereby reduce directly the toner consumption. In controlling the development processing unit 116, the CPU 91 controls the development bias voltage and/or charging grid bias voltage to thereby adjust the amount of toner attracted to the photosensitive drum.

According to the first embodiment, as described above, documents are usually printed without toner being saved and a proof printing-specified document has a toner saving intensity decided and is then printed with toner being saved automatically.

A second embodiment of the present invention to reduce the toner consumption will be described next. The basic configuration of the apparatus of the second embodiment remains unchanged from that of the first embodiment.

Figure 5:
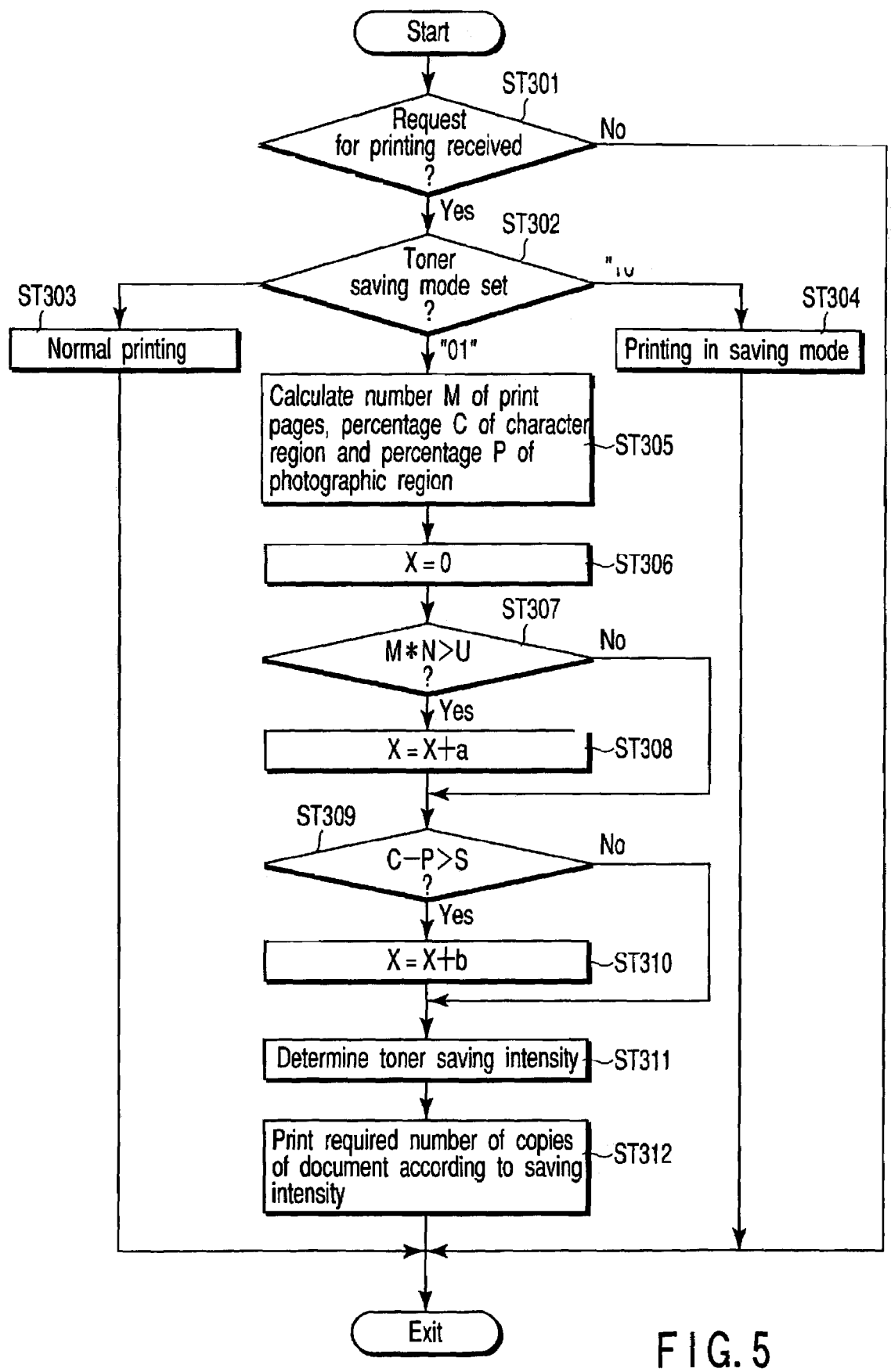
FIG. 5 is a flowchart illustrating an operation according to a second embodiment of the present invention.

FIG. 5 is a flowchart illustrating the operation of the second embodiment. The second embodiment has three toner saving modes. A toner saving mode is set by the user through the CPU 60. The setting is stored, for example, on the HDD 71 connected to the controller and then transferred to a table 94a of an NVRAM 94 by the CPU 91. According to this toner save mode, received image data is printed.

In the presence of a request for printing as in step 301, the CPU 91 refers to the table 94a of the NVRAM 94 to identify the toner saving mode. When the toner saving mode is "00", normal printing is made without toner being saved (step 303).

When the toner saving mode is "10", printing is made in a general saving mode as in step 304. For example, the toner saving intensity in this saving mode is the same as the toner saving setting of HIGH in step 207 in the first embodiment and the toner is saved to such an extent that the saving of toner can be recognized clearly. When the toner save mode is "01", the number M of pages of image data and the number N of print copies are stored in the table 99a of the printer controller 99 (Step 305). In subsequent step 306, the variable X for determining toner saving intensity is initialized to "0".

In step 307, a decision is made as to whether the product of the number M of pages to be printed and the number N of print copies stored into the printer controller 99 in step 305 is greater than a threshold U (an arbitrary natural number). If the product of the number M of pages to be printed and the number N of print copies is greater than the threshold U, then the CPU 91 stores the sum of the variable X representing the toner saving intensity and an arbitrary natural number a into the table 99a of the printer controller 99 as the toner saving intensity X as in step 308. If the product is smaller than the threshold U (No in step 307), the toner saving intensity X remains as it is.

Next, the CPU 91 calculates the difference between the character percentage C and the photograph percentage P obtained in step 305. Further, the CPU 91 makes a decision of whether the difference between the character percentage C and the photograph percentage P is greater than a threshold S (arbitrary ratio) (step 309). If the difference between the character percentage C and the photograph percentage P is greater than the threshold S, the sum of the variable X representing the toner saving intensity and an arbitrary natural number b into the table 99a as the toner saving intensity X as in step 310. If the difference between the character percentage C and the photograph percentage P is smaller than the threshold T (No in step 309), the toner saving intensity X remains as it is.

Step 311 is a process of determining the substantial intensity of the toner saving intensity obtained by processing so far and is the same as the processing of FIG. 4. In the case of this embodiment, however, since images to be printed are not those for proof printing, the degradation in image quality must be less than in the first embodiment. Therefore, a reduction in toner consumption is set considerably smaller than in the first embodiment. That is, even with the toner saving setting of HIGH in step 207, the toner is saved to such an extent that the user, when seeing the printed image, cannot much recognize that the toner has been saved. In step 312, a document is printed in a required number of copies according to the determined saving intensity.

A third embodiment of the present invention to reduce the toner consumption will be described next. The basic configuration of the apparatus of the third embodiment remains unchanged from that of the first embodiment.

Figure 6:
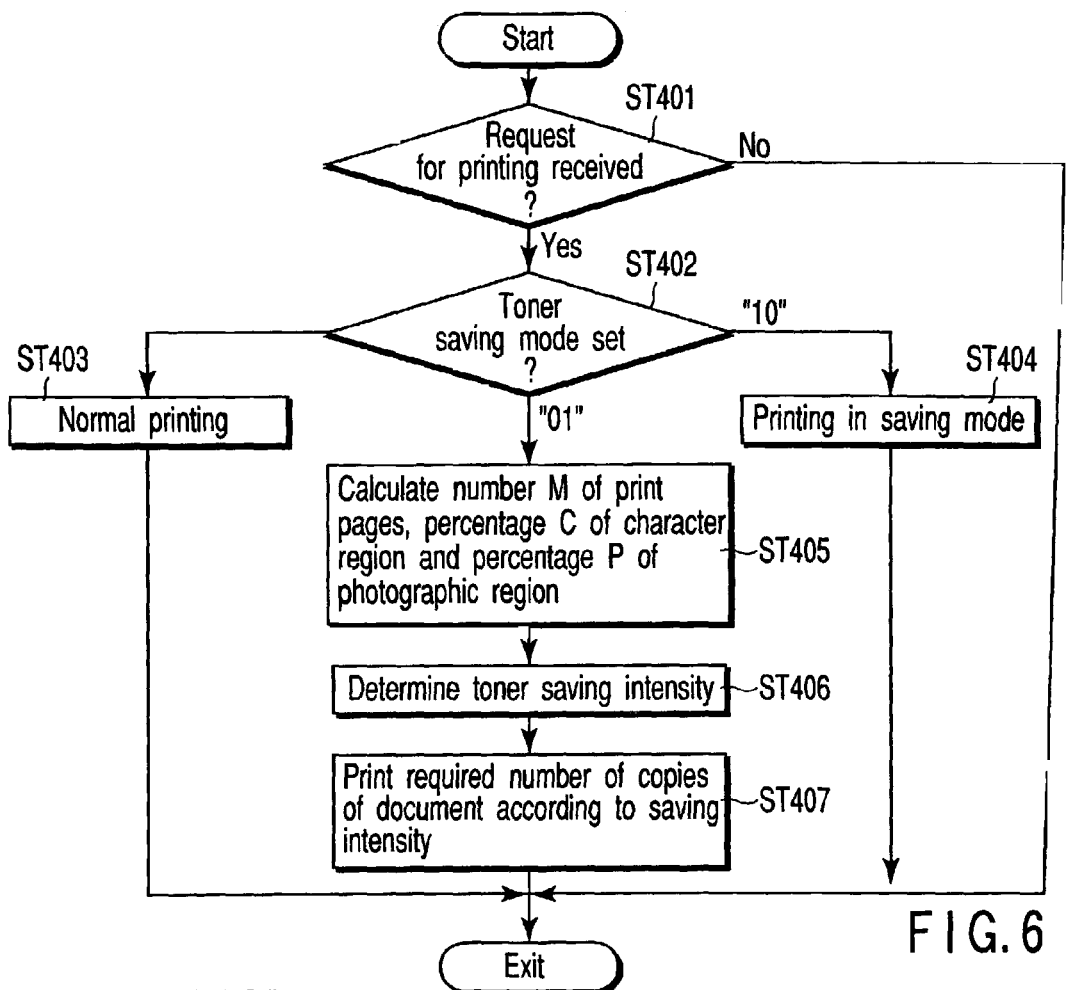
FIG. 6 is a flowchart illustrating the main flow of an operation according to a third embodiment of the present invention.

FIG. 6 is a flowchart illustrating the main flow of an operation according to the third embodiment. In the second embodiment, as in the second embodiment, three toner saving modes are set up. In comparison with the second embodiment, the third embodiment differs in the method of determination of toner saving (step 406) and remains unchanged in the other steps. Hereinafter, the toner saving determination method according to the third embodiment will be described mainly.

Figure 7:
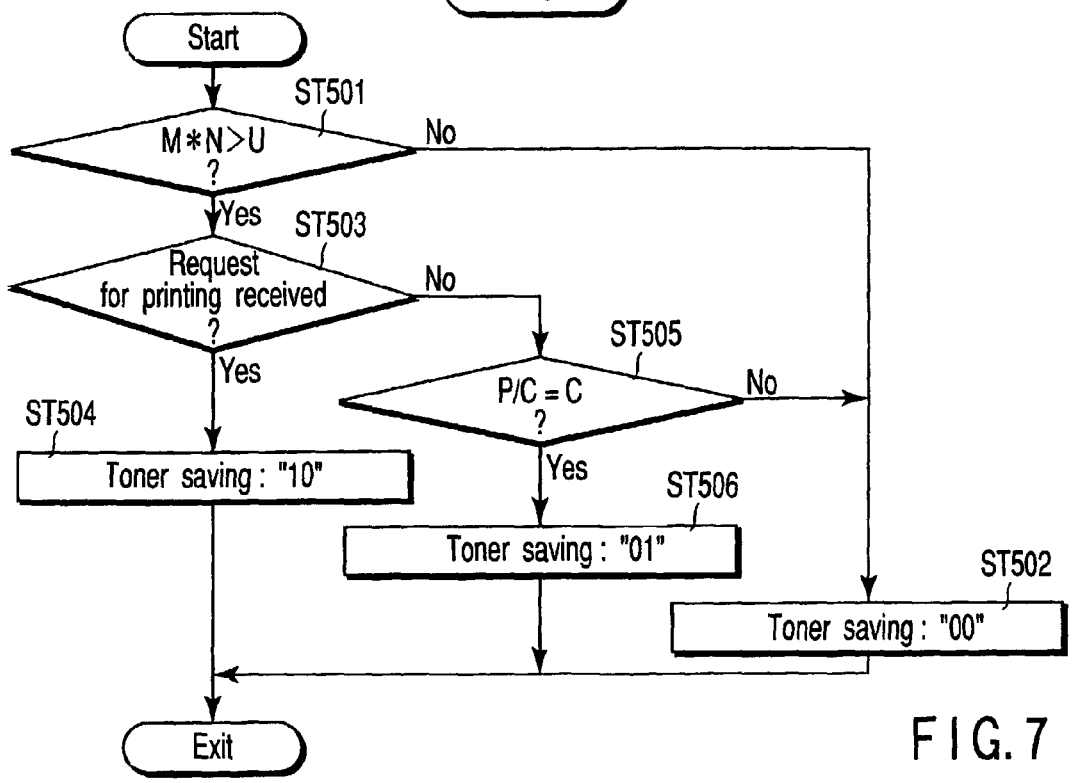
FIG. 7 is a flowchart illustrating the toner saving intensity determination process (ST406) in FIG. 6.

FIG. 7 is a flowchart illustrating the toner saving intensity determination process in step 406. As in step 501, the CPU 91 makes a decision of whether the product of the number M of pages and the number N of copies, i.e., the number of printouts, is greater than a predetermined threshold U. If the number of printouts is not greater than the predetermined threshold U, the toner saving intensity is set to "00". The toner saving intensity "00" indicates normal printing in which toner is not saved at all. Namely, if the number of printouts is smaller than the predetermined threshold U, printing is done without toner being saved.

When the number of printouts is greater than the predetermined threshold U (Yes in step 501), a decision is made as to whether or not the photographic region percentage P is "0". When the photographic region percentage P is "0", image data is formed totally of character/line drawings. In this case, the toner saving intensity is set to "10" (step 504). As described previously, images formed of character/line drawings little suffer from degradation in image quality even if they are printed at about ten percent reduction of toner. Therefore, the reduction of toner consumption in this case is set to about ten percent of toner consumption in normal printing.

In step 505, a decision is made as to whether the value obtained by dividing the photographic region percentage P by the character region percentage C is greater than a predetermined value V. The predetermined value V is of the order of, say, 0.1. If the value obtained by dividing the photographic region percentage P by the character region percentage C is smaller than the predetermined value V, most of the image data is formed of character/line drawings. In this case, the toner saving intensity is set to "01" (step 506). The reduction of toner consumption is set to about five percent of toner consumption in normal printing.

If the value obtained by dividing the photographic region percentage P by the character region percentage C is not smaller than the predetermined value V (No in step 505), the toner saving intensity is set to "00". As described previously, printing of images, such as photographic images, which have gradations with their density lowered is not desirable because the image quality is degraded considerably. Therefore, the amount by which toner is saved in this case is set to "0".

According to the second and third embodiments, as described above, printing can be made with the amount by which toner is saved changed automatically according to the number of printouts and the types of image data such as characters, photographs, etc. The consumption of toner can therefore be reduced significantly.

The invention claimed is:

1. An image forming apparatus comprising:
    a receiving section which receives image data from an external device;
    a decision section which makes a decision of whether image data received by the receiving section is image data for proof printing;
    a calculation section which includes (i) a page number calculation section which, when the decision section decides that the image data is image data for proof printing, calculates the number of pages of image data received by the receiving section, and (ii) a percentage calculation section which calculates the percentage of a character region and the percentage of a photographic region in the image data;
    a subtraction section which subtracts the percentage of the photographic region from the percentage of the character region calculated by the percentage calculation section, and provides the result of the subtraction;

a determination section which determines a print-time toner saving intensity on the basis of the number of pages calculated by the page number calculation section and the result of the subtraction provided by the subtraction section, the determination section setting the print-time toner saving intensity to a predetermined intensity when the result of the subtraction provided by the subtraction section is greater than a predetermined value, the determination section further determining the print-time toner saving intensity on the basis of the percentage of the character region and the percentage of the photographic region calculated by the percentage calculation section; and a print section which prints the image data with the toner consumption saved more than usual on the basis of the toner saving intensity determined by the determination section.

2. An apparatus according to claim 1, wherein:

the decision section sets the toner saving intensity to a first intensity, when the number of pages is greater than a predetermined number of pages, and the result of the subtraction is smaller than the predetermined value;

the decision section sets the toner saving intensity to a second intensity which is greater than the first intensity, when the number of pages is smaller than the predetermined number of pages, and the result of the subtraction is greater than the predetermined value; and the decision section sets the toner saving intensity to a third intensity which is greater than the second intensity, when the number of pages is greater than the predetermined number of pages, and the result of the subtraction is greater than the predetermined value.

3. An apparatus according to claim 1, wherein, when the number of pages calculated by the page number calculation section is greater than a predetermined number, the determination section sets the print-time toner saving intensity to a second predetermined intensity.

4. An image forming apparatus comprising:

a receiving section which receives image data from an external device;

a calculation section which calculates the number of pages and the number of copies of image data received by the receiving section;

a multiplication section which multiplies the number of pages and the number of copies calculated by the calculation section to provide the number of printouts;

a percentage calculation section which calculates the percentage of a character region and the percentage of a photographic region in the image data;

a subtraction section which subtracts the percentage of the photographic region from the percentage of the character region calculated by the percentage calculation section, and provides the result of the subtraction;

a determination section which determines a print-time toner saving intensity on the basis of the number of printouts provided by the multiplication section and the result of the subtraction provided by the subtraction section, the determination section setting the print-time toner saving intensity to a predetermined intensity when the result of the multiplication provided by the multiplication section is greater than a predetermined value, the determination section further determining the print-time toner saving intensity on the basis of the percentage of the character region and the percentage of the photographic region calculated by the percentage calculation section; and a print section which prints the image data with the toner consumption saved more than usual on the basis of the toner saving intensity determined by the determination section.

5. An apparatus according to claim 4, wherein, when the number of printouts calculated by the multiplication section is greater than a predetermined number, the determination section sets the toner saving intensity to a second predetermined intensity.

6. An image forming method comprising:

making a decision on whether image data received from an external device is image data for proof printing;

calculating the number of pages of received image data, the percentage of a character region and the percentage of a photographic region in the image data, when the image data is image data for proof printing;

subtracting the percentage of the photographic region from the percentage of the character region, and providing the result of the subtraction;

determining a print-time toner saving intensity on the basis of the number of pages and the result of the subtraction, and setting the print-time toner saving intensity to a predetermined intensity when the result of the subtraction is greater than a predetermined value, the determining step further determining the print-time toner saving intensity on the basis of the percentage of the character region and the percentage of the photographic region; and printing the image data with the toner consumption saved more than usual on the basis of the determined toner saving intensity.

7. A method according to claim 6, wherein, when the number of pages is greater than a predetermined number, the determination step sets the print-time toner saving intensity to a second predetermined intensity.

8. A method according to claim 6, wherein:

in determining the print-time toner saving intensity, the toner saving intensity is set to a first intensity, when the number of pages is greater than a predetermined number of pages, and the result of the subtraction is smaller than the predetermined value;

in determining the print-time toner saving intensity, the toner saving intensity is set to a second intensity which is greater than the first intensity, when the number of pages is smaller than a predetermined number of pages, and the result of the subtraction is greater than the predetermined value; and in determining the print-time toner saving intensity, the toner saving intensity is set to a third intensity which is greater than the second intensity, when the number of pages is greater than the predetermined number of pages, and the result of the subtraction is greater than the predetermined value.

9. An image forming apparatus comprising:

means for receiving image data from an external device;

means for making a decision of whether image data received by the receiving means is image data for proof printing;

means which includes (i) means for calculating, when the decision means decides that the image data is image data for proof printing, the number of pages of image data received by the receiving means, and (ii) means for calculating the percentage of a character region and the percentage of a photographic region in the image data;

means for subtracting the percentage of the photographic region from the percentage of the character region calculated by the percentage calculating means, and provides the result of the subtraction;

means for determining a print-time toner saving intensity on the basis of the number of pages calculated by the page number calculating means and the result of the subtraction provided by the subtracting means, the determining means setting the print-time toner saving intensity to a predetermined intensity, when the result of the subtraction provided by the subtracting means is greater than a predetermined value, the determination means further determining the print-time toner saving intensity on the basis of the percentage of the character region and the percentage of the photographic region calculated by the percentage calculation means; and means for printing the image data with the toner consumption saved more than usual on the basis of the toner saving intensity determined by the determining means.

10. An apparatus according to claim 9, wherein:

the determining means sets the toner saving intensity to a first intensity, when the number of pages is greater than a predetermined number of pages, and the result of the subtraction is smaller than the predetermined value;

the determining means sets the toner saving intensity to a second intensity which is greater than the first intensity, when the number of pages is smaller than the predetermined number of pages, and the result of the subtraction is greater than the predetermined value; and the determining means sets the toner saving intensity to a third intensity which is greater than the second intensity, when the number of pages is greater than the predetermined number of pages, and the result of the subtraction is greater than the predetermined value.

* * * * *